(No Model.)
E. REDMOND.
BICYCLE SUPPORT.
No. 306,177. Patented Oct. 7, 1884.
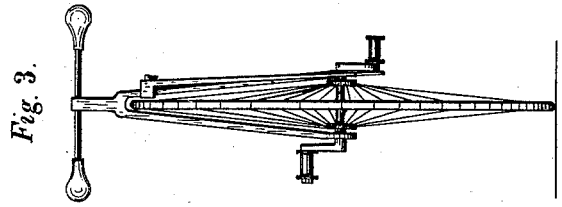
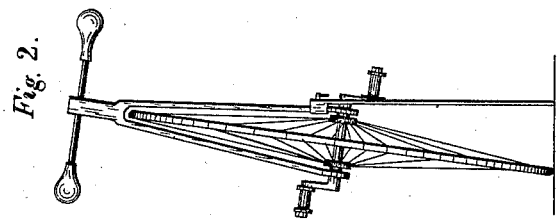
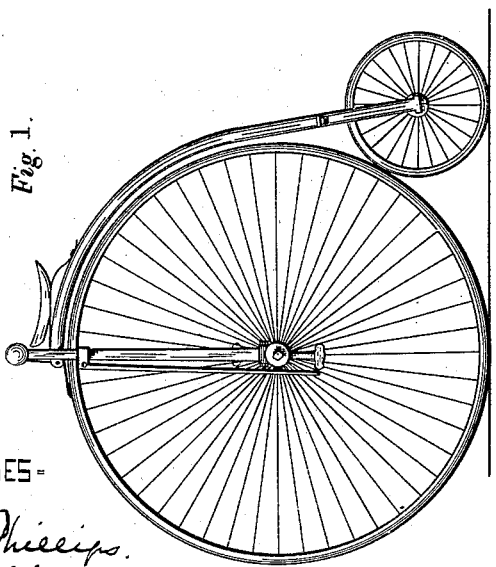
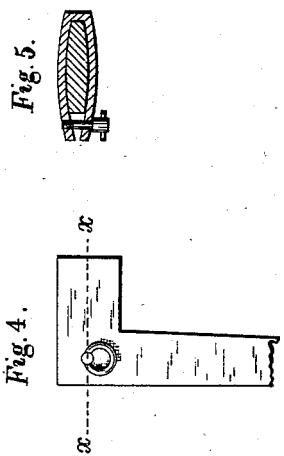
WITNESSES -
H. G. Phillips.
John Sherry.
INVENTOR -
Edmond Redmond

UNITED STATES PATENT OFFICE.

EDMOND REDMOND, OF ROCHESTER, NEW YORK.

BICYCLE-SUPPORT.

SPECIFICATION forming part of Letters Patent No. 306,177, dated October 7, 1884.

Application filed April 19, 1884. (No model.)

*To all whom it may concern:*

Be it known that I, EDMOND REDMOND, a citizen of the United States, residing at Rochester, in the county of Monroe and State of New York, have invented a new and useful Improvement in Bicycle-Supports, of which the following is a specification.

My invention relates to supports for bicycles in which the main or driving wheel is in front, and is straddled by a fork which rests on the axle of the main wheel, and supports the reach or backbone of the machine on top.

The object of my invention is to provide a portable leg or support for bicycles in which the large wheel is in front, so that a bicycle can be made to stand erect and stationary without resting on anything except its wheels and the leg.

Heretofore bicycles, when not in use, had to be held up by ropes from overhead, or by stands or supports not attached to the machine, or by reclining against stationary objects.

In the drawings, Figure 1 shows a side view of a bicycle with the support raised up on the fork. Fig. 2 shows a bicycle standing stationary with the assistance of the support. Fig. 3 shows a front view of a bicycle with the support raised; Fig. 4 shows an elevation of the support detached from the fork, and Fig. 5 shows a cross-section of the clamp on the fork.

My invention consists of a rod of suitable length attached to one leg of the fork of a bicycle, and adjustable thereon, so that it can be lowered to touch the ground when it is desired that the machine should stand, or raised when it is to be ridden. The rod is attached to the fork by a clamp, which, for simplicity, may be one end of the rod bent at right angles with the rod, and made to double around the leg of the bicycle-fork, on which it closes, by means of a set-screw. The rod may be united with the clamp by a suitable joint. A rod running vertically through a fixed projection on a bicycle-fork, and held by a set-screw, would answer the purpose also. When the support is to be employed to hold up the bicycle, the rod is lowered on the fork until the lower end is near the ground. The clamp is then tightened on the fork by its set-screw, and the lower end of the rod is drawn out sideways from the wheel. The machine is then tilted over until the support touches the ground, when the center of gravity of the bicycle will fall between the points of the wheels and support on the ground.

Having fully described my invention, what I claim as my invention, and desire to secure by Letters Patent, is—

In combination with a bicycle, a support or leg consisting of a rod attached by means of a clamp to one leg of a bicycle-fork, and adjustable on said fork by moving the clamp up or down the leg thereof.

EDMOND REDMOND.

Witnesses:
  E. H. C. GRIFFEN,
  JAMES COCHRANE.